US008355046B2

(12) United States Patent
Fujii

(10) Patent No.: US 8,355,046 B2
(45) Date of Patent: Jan. 15, 2013

(54) OBJECT TRACING DEVICE, OBJECT TRACING SYSTEM, AND OBJECT TRACING METHOD

(75) Inventor: Hirofumi Fujii, Yokohama (JP)

(73) Assignee: Panasonic Corporation, Osaka (JP)

( * ) Notice: Subject to any disclaimer, the term of this patent is extended or adjusted under 35 U.S.C. 154(b) by 1627 days.

(21) Appl. No.: 11/168,743

(22) Filed: Jun. 28, 2005

(65) Prior Publication Data

US 2006/0012681 A1    Jan. 19, 2006

(30) Foreign Application Priority Data

Jul. 14, 2004   (JP) ................................. 2004-206912

(51) Int. Cl.
*H04N 7/18* (2006.01)
(52) U.S. Cl. ...................................... 348/159; 348/143
(58) Field of Classification Search .................. 382/107, 382/154, 194, 224, 243, 142, 103, 190, 104, 382/305, 276, 189, 203, 209, 232, 260, 274, 382/285, 291, 292, 293, 295, 294, 106, 123, 382/168; 348/143, 169, 700, 157, 155, 148, 348/159, 153, 154, 705, 170; 375/240.08, 375/241.1
See application file for complete search history.

(56) References Cited

U.S. PATENT DOCUMENTS

| | | | |
|---|---|---|---|
| 5,254,686 A | 10/1993 | Koch | |
| 6,046,739 A * | 4/2000 | MacPhail | 715/853 |
| 6,215,519 B1 * | 4/2001 | Nayar et al. | 348/159 |
| 6,359,647 B1 * | 3/2002 | Sengupta et al. | 348/154 |
| 6,812,835 B2 | 11/2004 | Ito et al. | |
| 6,989,745 B1 * | 1/2006 | Milinusic et al. | 340/541 |
| 7,433,493 B1 * | 10/2008 | Miyoshi et al. | 382/103 |
| 7,750,936 B2 * | 7/2010 | Provinsal et al. | 348/143 |
| 2001/0019357 A1 | 9/2001 | Ito et al. | |
| 2001/0033330 A1 * | 10/2001 | Garoutte | 348/153 |
| 2001/0035907 A1 | 11/2001 | Broemmelsiek | |
| 2002/0052708 A1 * | 5/2002 | Pollard et al. | 702/151 |
| 2002/0057343 A1 * | 5/2002 | Ronk et al. | 348/169 |

(Continued)

FOREIGN PATENT DOCUMENTS

DE    196 39 728 A1    4/1998

(Continued)

OTHER PUBLICATIONS

Partial European Search Report corresponding to application EP 05 10 6332, dated Dec. 16, 2005.

*Primary Examiner* — Behrooz Senfi
(74) *Attorney, Agent, or Firm* — RatnerPrestia

(57) ABSTRACT

An object tracing device, an object tracing system and an object tracing method are disclosed, which traces a truly suspicious object even when a new suspicious object comes into an area to be monitored after a suspicious object has been started to be traced. In the object tracing device, an object-identifying part identifies a plurality of objects in a wide-angle picture taken by a first picture-taking device; a chronological-information-creating part creates chronological information of the identified objects; an object-selecting part selects an object having a selecting condition identical with that of the object defined as the object to be traced; and a control part drives a second picture-taking device taking a picture of a narrower angle than a first picture-taking device does and controls the picture-taking device in taking a picture of the selected object.

12 Claims, 8 Drawing Sheets

U.S. PATENT DOCUMENTS

| | | | |
|---|---|---|---|
| 2005/0012817 A1* | 1/2005 | Hampapur et al. | 348/143 |
| 2005/0185823 A1* | 8/2005 | Brown et al. | 382/103 |
| 2008/0285802 A1* | 11/2008 | Bramblet et al. | 382/103 |
| 2009/0116692 A1* | 5/2009 | Paul et al. | 382/103 |

FOREIGN PATENT DOCUMENTS

| | | |
|---|---|---|
| EP | 1 103 821 A2 | 5/2001 |
| JP | 4-273689 A | 9/1992 |
| JP | 06-169458 | 6/1994 |
| JP | 11-069342 | 3/1999 |
| JP | 2000-295598 A | 10/2000 |
| JP | 2001-319279 A | 11/2001 |
| JP | 2002-42139 A | 2/2002 |
| JP | 2004-96402 A | 3/2004 |

* cited by examiner

OBJECT TRACING DEVICE, OBJECT TRACING SYSTEM, AND OBJECT TRACING METHOD

TECHNICAL FIELD

This invention relates to an object tracing device, an object tracing system and an object tracing method for tracing an object to be traced in a picture, particularly to an object tracing device, an object tracing system and an object tracing method, which select an object to be traced out of a picture taken by a wide-angle video camera, and trace a picture of the selected object by a telephoto lens video camera having a different picture angle than the wide-angle video camera and takes a picture of the object.

BACKGROUND ART

In recent years, an object tracing device and an object tracing system are put into practical use in a field of monitoring device with a video camera, in which the video camera is taking a moving picture at any time and when any suspicious object is identified, the video camera starts tracing the object and taking a video picture of it.

Among those, an object tracing system having a wide-angle video camera and a video camera with a telephoto lens is widely deployed. The wide-angle camera has a fixed picture angle. The camera with a telephoto lens has a movable picture angle in up, down, left and right directions (hereinafter, the movements are called 'pan' and 'tilt'). The object tracing system equipped with two cameras having a different picture-taking angle is widely used because it does not require complicated structure such as of a high-powered zoom-lens and its control means.

In an example of the object tracing system, a wide-angle video camera takes a picture of relatively a wide area to be monitored, and when an object comes into the picture, a telephoto video camera is directed toward the invading object facing with the object and taking a picture of the object. A display part displays an enlarged picture of the object. With this type of conventional structure, a surveyor can judge whether the invading object is really a suspicious person or not by seeing the enlarged picture of the object displayed on the display part. The above conventional constitution is disclosed by Unexamined Japanese Patent Publication No. H11-69342.

However, with this type of conventional technology, there is a possibility that the system does not trace a truly suspicious object when a plurality of invading objects exists from the beginning in the picture of the area-to-be-monitored taken by the wide-angle video camera. With this type of system, when an invading object is identified in a wide-angle picture, the telephoto lens starts tracing the object taking a picture of the invading object. However, if another invading object comes into the area to be monitored after above process, there is also a possibility that the system does not trace a really suspicious object.

SUMMARY OF THE INVENTION

The invention provides an object tracing device, an object tracing system and an object tracing method which can trace a truly suspicious object even when a plurality of invading objects exists at the beginning in a picture of an area to be monitored which is taken by a wide-angle video camera or even when new invading object comes into the area to be monitored after a invading object has been identified and a telephoto video camera has started tracing the object and taking the picture of it.

The object tracing device includes a first picture-input part, a second picture-input part, an object-identifying part, a chronological-information-creating part, an object-selecting part, and a control part. The first picture-input part inputs a picture taken by a first picture-taking device taking a wide-angle picture in a predetermined angle. The second picture-input part inputs a picture taken by a second picture-taking device taking a picture of a narrower angle than the first picture-taking device does. The object-identifying part identifies a plurality of objects in the wide-angle picture input by the first picture-input part. The chronological-information-creating part creates chronological information of each of the plurality of objects and its positional information in the wide-angle picture. The object-selecting part selects an object to be traced out of the plurality of objects, the object having chronological information that corresponds to chronological information of a selecting condition of the object to be traced. The control part drives and controls the second picture-taking device for taking a picture of the object selected by the object-selecting part.

According to this constitution, the device can trace a truly suspicious object even when a plurality of invading objects exists from the beginning in the picture of the area to be monitored taken by the wide-angle video camera. Even when a new invading object comes into the area to be monitored after an invading object is identified and the telephoto video camera has started tracing the object, a truly suspicious object can still be traced.

The object tracing device of the invention can further includes a framing part which frames a partial view of each of the plurality of objects identified by the object-identifying part out of the wide-angle picture. The chronological-information-creating part creates the chronological information of each object using the partial view. With this arrangement, chronological information for each of the object can be created fast.

The chronological-information-creating part can create chronological information by making central coordinates of a partial view as its positional information. With this arrangement, the chronological information is created by such a simple operation as to calculate the central coordinates.

The object tracing device can further includes a condition-establishing part establishing the selecting condition of chronological information of the object to be traced. With this arrangement, a surveyor can set up a selecting condition by inputting the condition from an outside.

The condition-establishing part can establish a plurality of selecting conditions having a different ranking of priority. The object-selecting part can select an object to be traced based on the priority information of the selecting condition. With this arrangement, the object tracing device can select an object to be traced by taking a priority of selecting condition into consideration. Accordingly, an object having a higher priority can always be selected as an object to be traced.

The condition-establishing part can establish a specific passing area in the wide-angle picture as a selecting condition. With this arrangement, an object passing through the specific area can be traced as an object to be traced.

The condition-establishing part can establish an object's stagnant time in the wide-angle picture as a selecting condition. With this arrangement, an object stagnant for over a specified period of time can be traced.

The condition-establishing part can set up an object's moving direction in the wide-angle picture as a selecting condition. With this arrangement, an object moving in a specific direction can be traced.

The condition-establishing part can establish a specific moving path where an object passes through in the wide-angle picture, as a selecting condition. With this arrangement, because a specific moving path is set up, an object moving other than the specified path can be traced. Any object moving along a suspicious path can also be traced.

The chronological-information-creating part can create chronological information the plurality of objects including color information of the objects, and the condition-establishing part can include color information of an object in wide-angle picture when establishing a selecting condition. With this arrangement, the object tracing device can trace an object by adding color information in the selecting condition.

The condition-establishing part can establish a selecting condition by combining a plurality of selecting conditions including the passing area, the stagnant time, the moving direction, the moving path, or the color. With this arrangement, the device can trace an object to be traced with a plurality of selecting conditions combined.

The output information creating device according to the present invention can further include an output information creating part. The output information creating part creates a picture of a wide-angle input by the first picture-input part and an enlarged picture of an object to be traced input by the second picture-input part. The information creating part also creates information for outputting chronological information of a plurality of objects. With this arrangement, the output information creating part can output the wide-angle picture and the enlarged picture of the object-to-be-traced, realizing a device displaying such information on a device outside the object tracing device, to be seen at a glance.

The output information creating part can also create information for outputting chronological information of the plurality of objects to be superimposed on a wide-angle picture. With this arrangement, the object tracing device can realize a device outside the object tracing device, with which a surveyor can see chronological information of objects, a moving path for an example, at a glance outside the object tracing device.

The object tracing method according to the present invention is a method using an object tracing device having a first picture-input part and a second picture-input part. The first picture-input part inputs a picture taken by the first picture-taking device taking a wide-angle picture in a predetermined scope. The second picture-input part inputs a picture taken by the second picture-taking device taking a picture of a narrower scope than the first picture-taking device does.

The object tracing method of this invention includes an object-identifying step, a chronological-information-creating step, an object-selecting step, and a controlling step.

The object-identifying step is a step for identifying a plurality of objects in the wide angle picture. The chronological-information-creating step is a step for creating chronological information of each of the plurality of objects including positional information of it in the wide-angle picture. The object-selecting step is a step for selecting an object to be traced out of the plurality of objects, the object meeting with chronological information of a selecting condition of the object to be traced. The controlling step is a step for driving the second picture-taking device and controlling the device for taking a picture of the object to be traced.

With this method, when a plurality of invading objects exists from the beginning in the picture of the area to be monitored taken by a wide-angle video camera, a truly suspicious object can be traced. Even when another invading object comes into the area to be monitored after an invading object has been identified and the telephoto video camera has started tracing the object, the truly suspicious object can be traced.

DETAILED DESCRIPTION OF PREFERRED EMBODIMENT

Following, an exemplary embodiment of the present invention is explained with reference to the drawings.

Exemplary Embodiment

Figure 1:
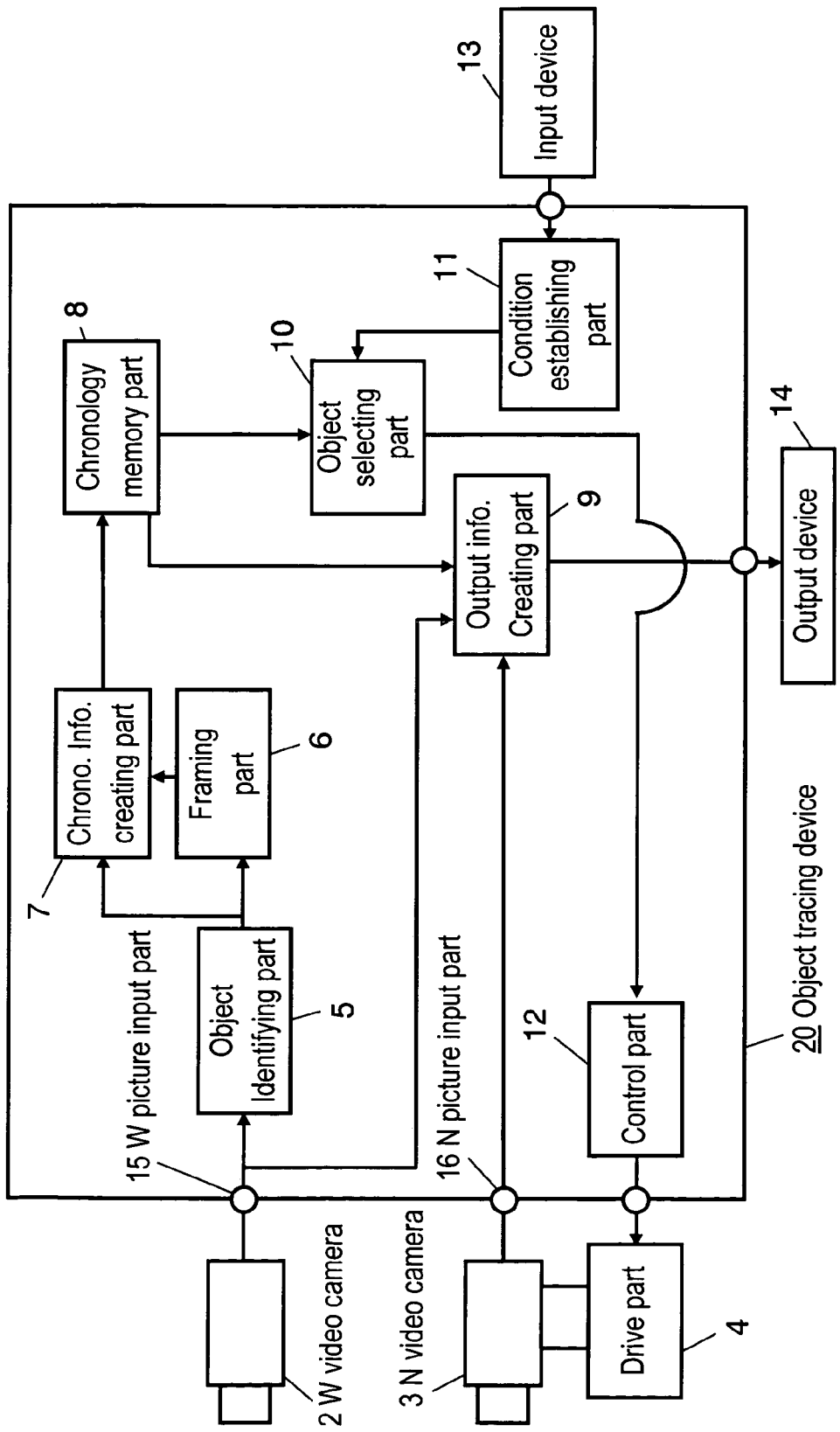
FIG. 1 is a block diagram showing a structure of an object tracing system and an object tracing device, in accordance with an exemplary embodiment of the present invention.

FIG. 1 is a block diagram showing a structure of object tracing system 30 and object tracing device 20 in accordance with an exemplary embodiment of the present invention.

Object tracing system 30 according to the exemplary embodiment of the present invention includes W video camera 2, drive part 4, N video camera 3, object tracing device 20, input device 13, and output device 14. W video camera 2 is a first picture-taking device taking a wide-angle picture in a relatively wide angle area to be monitored. N video camera 3 is a second picture-taking device taking a telescopic picture narrower than what W video camera 2 does, which panning and tilting motions are made possible with drive part 4. Object tracing device 20 identifies an object to be traced in the wide-angle picture taken by W video camera 2 and directs N video camera 3 toward the object to be traced by controlling drive part 4. Input device 13 inputs object tracing device 20 a condition for tracing the object to be traced. Output device 14 displays the wide-angle picture taken by W video camera 2 and an enlarged picture of the object to be traced taken by N video camera 3.

A video camera device equipped with a widely used monitoring wide-angle lens can be utilized as W video camera 2.

A video camera device equipped with a telephoto lens of a narrower picture angle than the optical device of W video camera 2 can be utilized as N video camera 3. N video camera 3 has a zoom-lens for taking an appropriate size of enlarged picture of the object to be traced.

A publicly known electronically controllable pan-head can be utilized for drive part 4 for panning and tilting N video camera 3.

Widely known inputting devices including a keyboard, a mouse and a trackball can be utilized for input device 13.

Publicly known display devices such as a LCD (Liquid Crystal Display), an EL (Electronic-Luminescent) and CRT (Cathode Ray Tube) can be utilized for output device 14.

With object tracing system 30 in accordance with the exemplary embodiment of the invention, a surveying person (hereinafter, a surveyor) establishes an area to be monitored in a wide-angle picture which is taken by W video camera 2, and inputs the selecting condition of an object to be traced. Object tracing device 20 identifies, out of the wide-angle picture taken by W video camera 2, a suspicious person, an animal or an object which satisfies the already input selecting condition. Output device 14 displays an enlarged picture of the object to be traced which N video camera 3 takes. The surveyor, seeing the enlarged picture displayed on output device 14, determines whether or not the displayed object is really the suspicious object that needs to be traced.

Constitution of object tracing device 20 according to the exemplary embodiment of the present invention is further explained in detail. As shown in FIG. 1, object tracing device 20 according to the exemplary embodiment of the present invention includes W picture-input part 15, object-identifying part 5, framing part 6, chronological-information-creating part 7, chronology memory part 8, condition-establishing part 11, object-selecting part 10, control part 12, N picture-input part 16, and output information creating part 9. W picture-input part 15 is a first picture-input part inputting a video signal of the wide-angle picture the W video camera outputs. Object-identifying part 5 identifies a plurality of objects in the wide-angle picture input by W picture-input part 15. Framing part 6 is a video picture framing part framing out a partial view of each of the objects identified by object-identifying part 5. Using the partial view framed by framing part 6, chronological-information-creating part 7 creates chronological information of each of the plurality of objects in the wide-angle picture sent out by object-identifying part 5. The chronological information is explained later. Chronology memory part 8 stores memory of chronological information created for each of the plurality of objects. Condition-establishing part 11 establishes a condition of the chronological information of the object-to-be-traced which input device 13 inputs. Object-selecting part 10 selects an object having identical chronological information to the chronological information established by condition-establishing part 11, in selecting an object to be traced out of a plurality of objects. Control part 12 controls movement of drive part 4 based on positional information of the object to be traced selected by selecting-part 10 out of the wide-angle picture.

Output information creating part 9 creates information to be output to output device 14, based on the wide-angle picture, the enlarged picture and the chronological information. The wide-angle picture is a picture taken by W video camera 2. The enlarged picture is a picture of the object to be traced taken by N video camera device 3 then input by N picture-input part 16 which is a second picture-input part. Chronological information is information stored in chronological memory part 8.

Each constitutional members of the device is explained in detail below.

Object-identifying part 5 identifies an object which can be an object to be traced out of a wide-angle picture input by W picture-input part 15. The picture input by W picture-input part 15 is a picture of the area to be monitored taken by W video camera 2. The object which can be an object to be traced is a plurality of objects which is moving. Identification of the plurality of the moving object is possible by a differential method for instance. With the differential method, a differential between input picture and back ground picture is taken, and when the differential exceeds a certain predetermined threshold in an area, the area is recognized as a moving object. The identification is also possible by memorizing a distinctive feature like hue of an already identified object to be traced and then finding out an object fitting to the distinctive feature. This identification method is disclosed by Japanese Patent No. 3197633.

Figure 2:
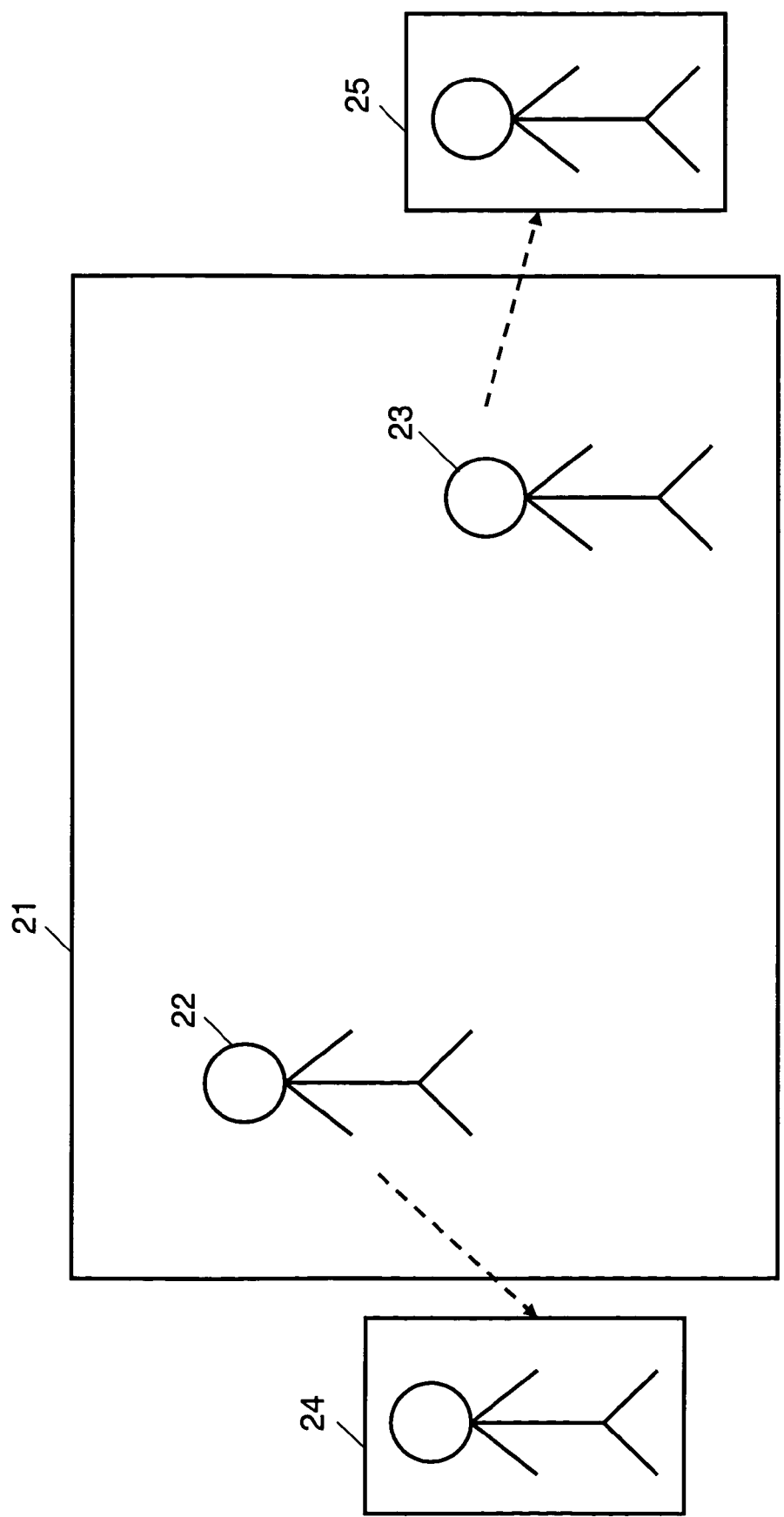
FIG. 2 is a schematic diagram for explaining a function of a framing part of the object tracing device in accordance with the exemplary embodiment of the present invention.

Framing part 6 makes a partial view of each object by framing an area of the objects out of a plurality of objects which object-identifying part 5 identified in the wide-angle picture. FIG. 2 is a drawing explaining a feature of framing part 6 of object tracing device 20 in the exemplary embodiment of the invention. As an example, wide-angle picture 21 taken by W video camera 2 is shown in FIG. 2, where two objects first object 22 and second object 23 are identified by object-identifying part 5. As shown in FIG. 2, framing part 6 frames out first partial view 24 containing first object 22 and second partial view 25 containing second object 23, from wide-angle picture 21. In framing out the partial view, framing part 6 frames a rectangular area containing the object in wide-angle picture 21; for an example, when framing out first partial view 24, containing an area of first object 22. Framing part 6 of object tracing device 20 in the exemplary embodiment is not limited to framing out a partial view only in a rectangular shape, but framing part 6 of object tracing device 20 can frame out a partial view of an object in a circular shape, or it can frame out the partial view along a shape of the object from wide-angle picture 21.

Figure 3:
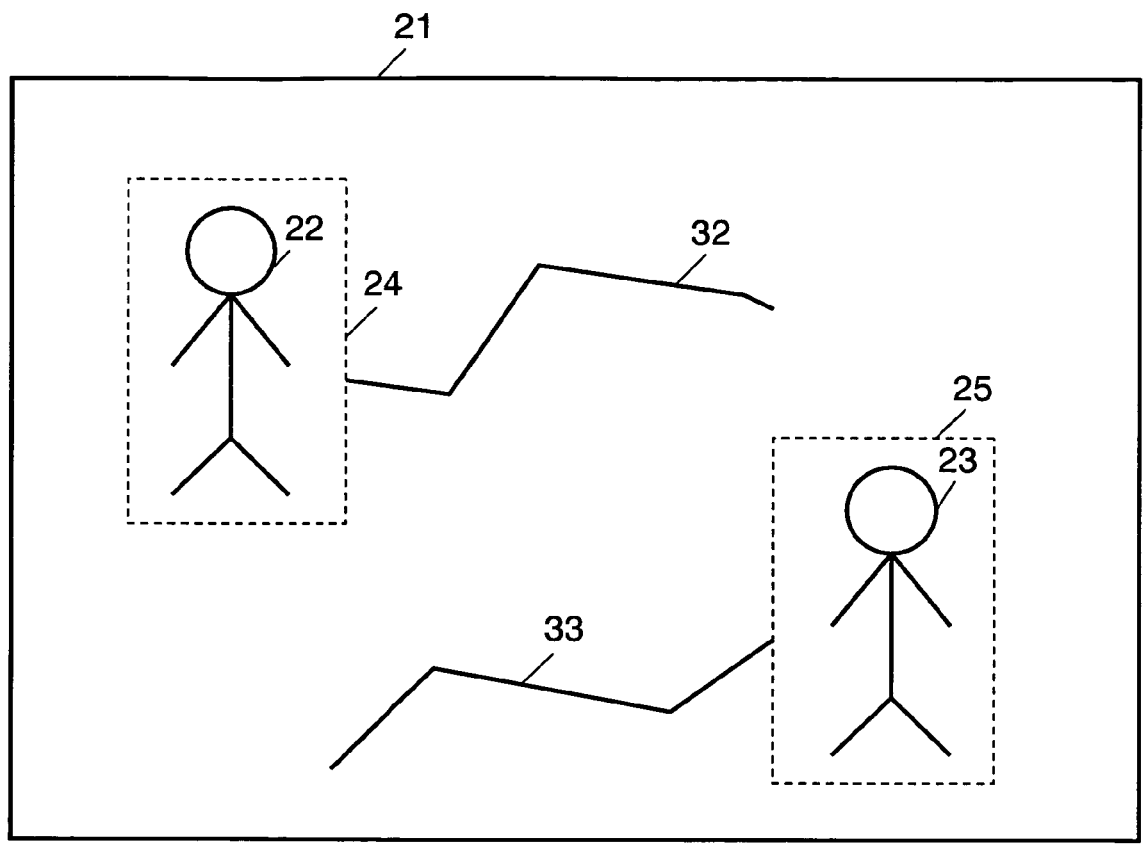
FIG. 3 is a schematic diagram for explaining chronological information of the object tracing device.

Chronological-information-creating part 7 creates chronological information of each of the plurality of objects with their positional information by using the partial view framed out by chronological-information-framing part 6 and wide-angle picture 21. Such chronological information is explained in detail next. FIG. 3 is a drawing explaining the chronological information of object tracing device 20. In a case where first object 22 moves along moving path 32 and second object 23 along moving path 33 in wide-angle picture 21, chronological information in object tracing device 20 contains moving path 32 and 33 of the objects in the positional information.

More specifically, chronological-information-creating part 7 creates chronological information of first object 22 using coordinates information indicating a central position (or central gravity) of first partial view 24 of first object 22 in wide-angle picture 21. Chronological-information-creating part 7 likewise creates chronological information of second object 23 using coordinates information indicating a central position of first partial view 25 of second object 23 in wide-angle picture 21. Chronological-information-creating part 7 sends chronological information of all the objects with their ID and time the chronological information was made to chronology memory part 8. The information can be expressed by a formula of "ID, time (hour, minute, second), and central coordinates (X, Y)".

In an example shown in FIG. 3, if ID 1 is given to first object 22, ID 2 to second object 23, central coordinates (210 130) to first partial view 24 and central coordinates (X2, Y2) to second partial view 25, and if time the chronological information made is 12:10:12, then chronological-information-creating part 7 creates chronological information of "1, 12, 10, 12 210, 130" for first object 22 and "2, 12, 10, 12, X2, Y2"

for second object 23. Chronological-information-creating part 7 sends the created chronological information to chronology memory part 8.

Figure 4:
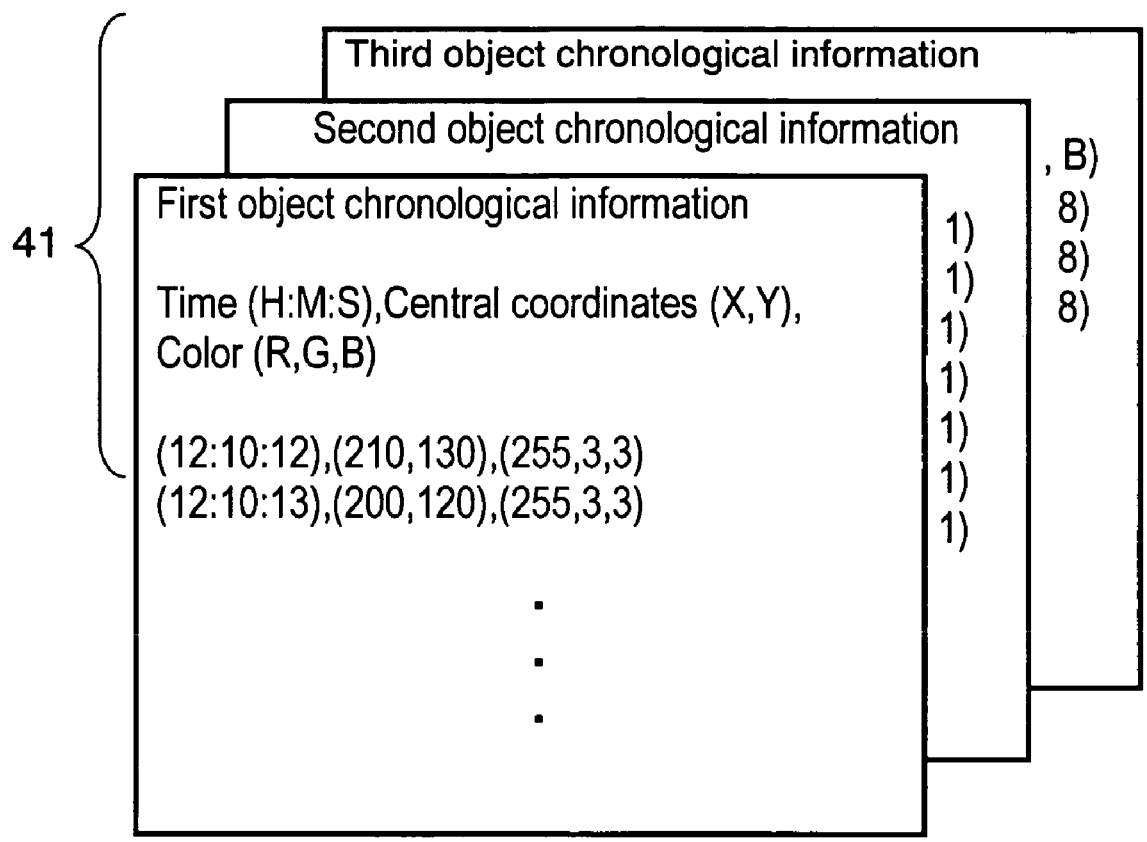
FIG. 4 is a schematic diagram showing an example of chronological information stored in a chronology memory part of the object tracing device.

Chronology memory part 8 stores memory of chronological information thus produced. An example of chronological information stored in chronology memory part 8 is shown in FIG. 4. FIG. 4 is a schematic diagram showing an example of chronological information stored in a chronology memory part 8 of the object tracing device 20. In the example shown in FIG. 4, chronological information 41 includes chronological color information of each of the objects, color and brightness represented by R,G,B format, in addition to central coordinates and time information. In this manner, chronological information 41 has color information of each of the plurality of objects to in adding to their positional information in wide-angle picture 21, therewith the tracing device can select an object to be traced with color information. As an example, when employees wear a particular color of uniform, the tracing device regards an object wearing clothes in a different color than the uniform is an object to be traced.

As described, object tracing device 20 in accordance with the exemplary embodiment of the present invention stores chronological information 41 of each of the plurality of objects in wide-angle picture 21 taken by W video camera 2 in chronology memory part 8.

Chronology memory part 8 can be composed of an appropriately selected publicly known recording media such as semiconductor memory, HDD and DVD.

Figure 5:
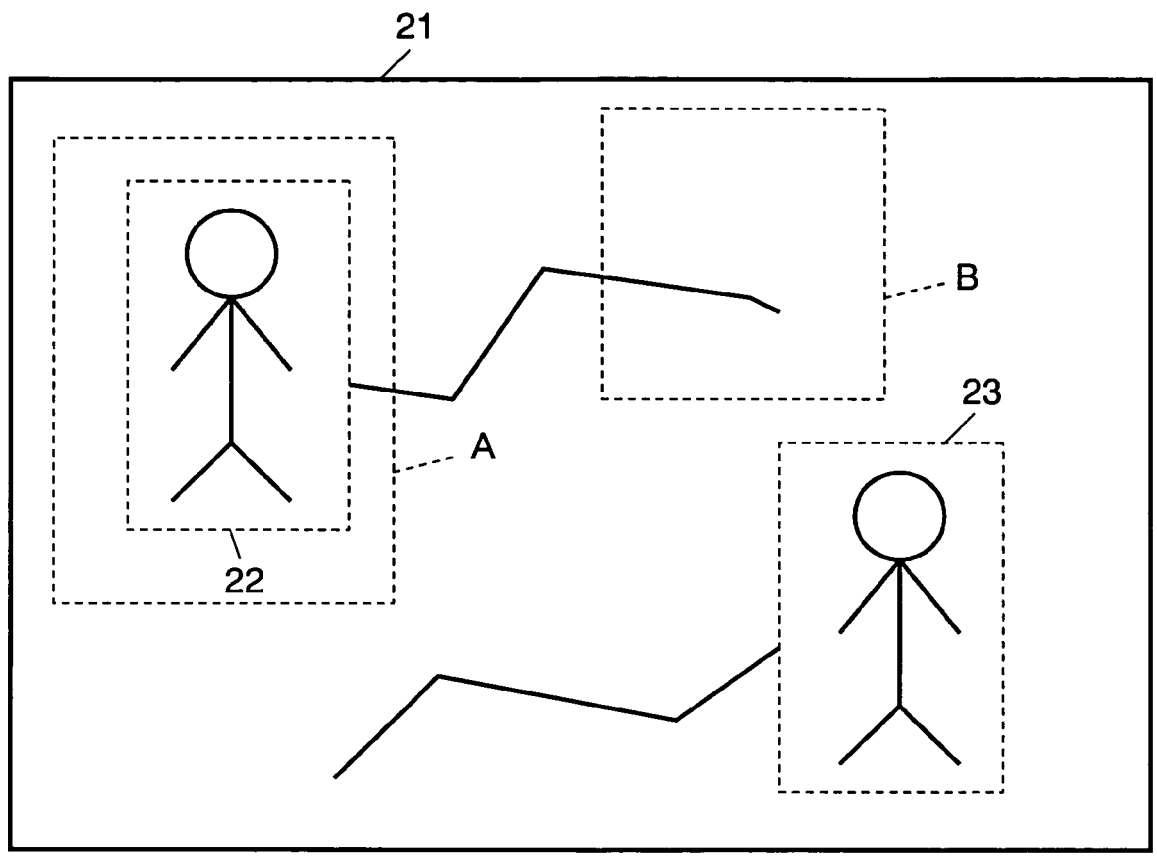
FIG. 5 is a schematic diagram for explaining an area to be monitored in the object tracing device.

Next, an area to be monitored in wide-angle picture 21 is explained. FIG. 5 is a drawing for explaining an area to be monitored in object tracing device 20 in accordance with the exemplary embodiment of the present invention. A surveyor, using input device 13, establishes a plurality of areas to be monitored such as area A and area B in wide-angle picture 21 displayed on output device 14, as shown in FIG. 5. The established area A and area B are used when condition-establishing part 11 establishing a selecting condition of chronological information for the object to be traced.

Figure 6:
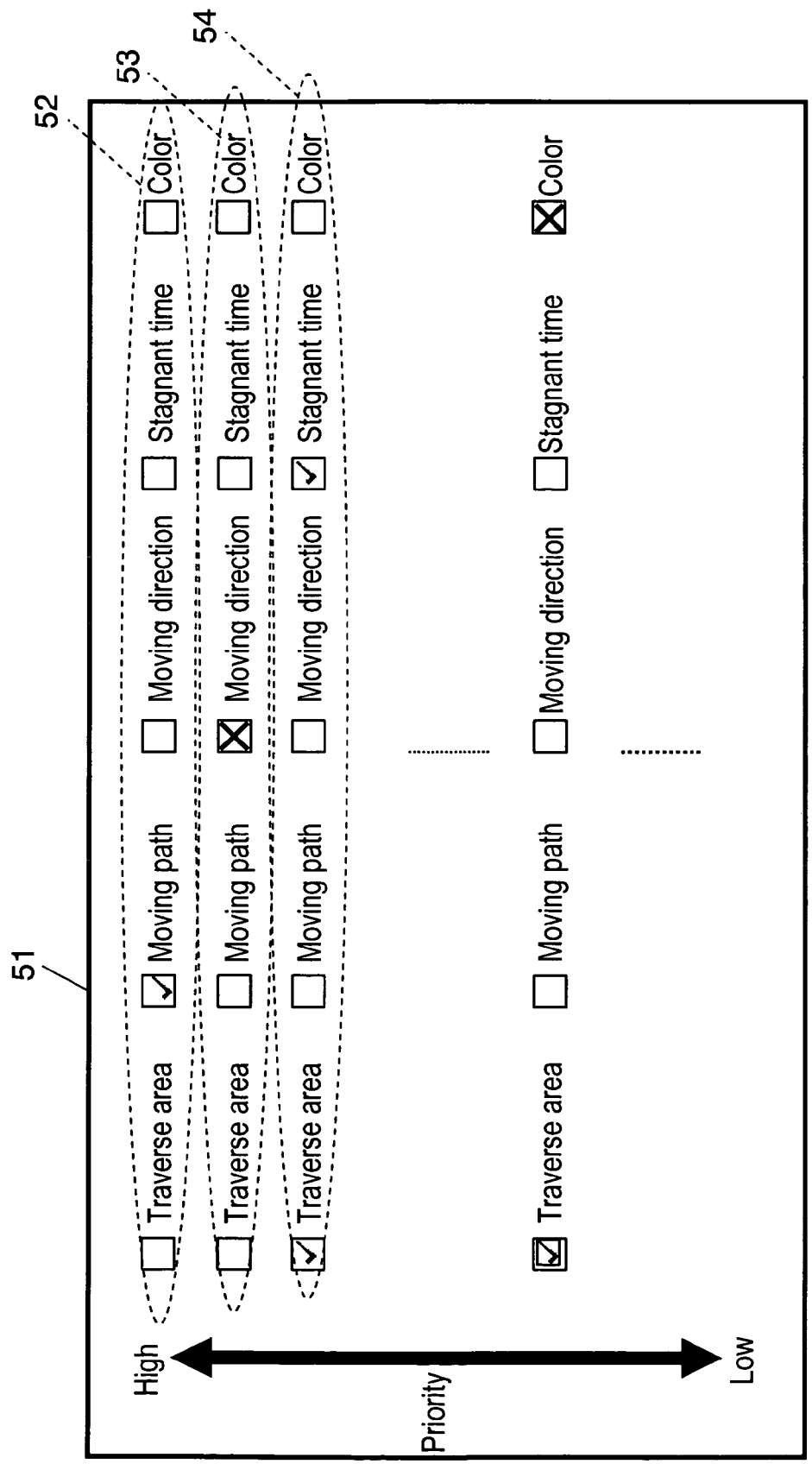
FIG. 6 is a schematic diagram showing an example of an input guide display of an input device of the object tracing system in accordance with the exemplary embodiment of the present invention.

The surveyor can establish an area to be monitored and other selecting condition of the object to be traced on an input display guide displayed on output device 14. FIG. 6 is a schematic diagram showing an example of input guide display 51 of input device 13 in object tracing system 30 in accordance with the exemplary embodiment of the present invention. As shown in FIG. 6, input display guide 51 of object tracing system 30 in accordance with the exemplary embodiment of the present invention shows a selecting condition of an object to be traced (hereinafter, called a 'selecting condition') with the selecting items arranged in a horizontal line. The surveyor can establish a plurality of selecting conditions on input guide display 51 by selecting items of selecting condition horizontally lined up in each line (hereinafter, called a 'line of selecting condition') and by choosing a plurality of lines of selecting condition which vertically line up The example in FIG. 6 shows that the line of selecting condition has five each of selecting items. In FIG. 6, line of selecting condition 52 shows that a first selecting condition to a fifth selecting condition are lined up from left side of paper to right side of the paper. The first selecting condition 'traverse area' means that 'any object passing through a predetermined area to be monitored to be regarded as an object to be traced.' The second selecting condition of 'moving path' means that 'any object moving along the path to be regarded as an object to be traced.' The third selecting condition 'moving direction' means that 'any object moving across the area to be monitored toward a specified direction is regarded as an object to be traced.' The fourth selecting condition 'stagnant time' means that 'any object staying for over the specified time is regarded as an object to be traced.' The fifth selecting condition 'color' means that 'any object in a specified color is regarded as an object to be traced.' A vertical order of the line of selecting condition indicates an order of priority of each line of selecting condition. In input guide display 51, the priority increases as a position of the line moves up from lower to higher.

Each selecting condition can be established by checking a box of an item of condition in each 'line of selecting condition'. When a checkbox is checked, an input picture appears (not illustrated) for inputting a necessary condition like 'area to be monitored'. When 'traverse area' or 'moving path' needs to be selected as a selecting condition as an example, since a picture taken by W video camera 2 is displayed on output device 14, the surveyor can specify 'area to be monitored' or 'moving path' directly on the screen of input device 13.

As an example, when 'moving direction' is selected, selectable items such as 'up' 'down' 'left' and 'right' are shown on a screen of input display; and when 'color' is a selecting condition, a list of selectable color such as 'red' and 'blue' is displayed on the input screen so a moving direction and a color of an object to be traced can be selected out of the lists and be specified. If 'stagnant time' is specified, a picture with numbers showing an upper limit of the stagnant time is displayed on output device 14. So the selecting condition can be specified by inputting the upper limit of the stagnant time by input device 13.

Furthermore, with object tracing system 30 according to the exemplary embodiment of the present invention, if an already marked check box is marked again on input guide display 51, the display mark is changed to show an 'x' mark, indicating the selecting condition is changed to a negative condition. As an example, when a selecting condition of 'moving direction' is rechecked changing the condition to a negative condition showing 'x', and then a selecting item 'up' is chosen, the selecting condition now regards any object moving other than in upward direction is an object to be traced.

Still further, a plurality of selecting-items can be selected within a line of selecting condition, setting up a combination of the selected items. For an example, when selecting conditions of a 'traverse area' and a 'stagnant time' are combined, the combined selecting condition regards an object staying for over a fixed period of time in a specified area as an object to be traced. In line-of-selecting-condition 54 in FIG. 6, 'traverse area' and 'stagnant time' are selected as a selecting condition. To such a combined selecting condition, a negative condition can also be applied. For an example, when a selecting condition of 'traverse area' and a negative selecting condition of 'color' are combined, the combined selecting condition regards any moving object passing through the 'traverse area' but in any color other than a specified 'color' as an object to be traced.

As previously mentioned, positional relationship between the lines of selecting condition represents an order of priority of each line-of-selecting-condition. In an example in FIG. 6, the higher of the position of the line is, the higher the order of the priority of the line is; and the lower the position of the line, the lower the priority of the line. The order of priority is explained next. In FIG. 6, line of selecting condition 52 is positioned at a highest position, line of selecting condition 53 is positioned under line 52, and line of selecting condition 54 is positioned under line 52. When no object meeting a selecting condition of lines 52 or 53 exist, but an object meeting only a condition of line 54 exist, an object meeting line-ofselecting 54 is selected as an object to be traced out of the plurality of objects, and N video camera 3 starts taking a video picture of the object with a method which is explained later. However, if another object having a higher rank of selecting conditions is identified, the object is regarded as an object to be traced. In this case, the higher rank of selecting condition are selecting condition line 52 or selecting condition line 53. A newly found object which is regarded as an object to be traced is picture-taken by N video camera 3. In this manner, an object which is in higher rank of selecting condition and is really suspicious object is always be identified as an object to be traced. When a plurality of objects is identified in wide-angle picture 21, object-selecting part 10 selects an object meeting a higher rank of priority as an object to be traced. Thus, even when a plurality of objects is identified, an object which satisfies a higher rank of priority and is really a suspicious object is identified as an object to be traced at any time.

Condition-establishing part 11 establishes ranking of the lines of selecting condition based on information on an area to be monitored and a selecting condition input by input device 13, and sends the ranking information to object-selecting part 10 as a selecting condition of chronological information 41 of an object to be traced.

Following, a method of selecting the object to be traced by object-selecting part 10 is explained by condition to condition.

When 'traverse area' is a selecting condition and the area to be monitored is specified in a shape of an arbitrary polygon, condition-establishing part 11 sends the number of vertexes and coordinates information of the vertexes of the polygon to object-selecting part 10. Object-selecting part 10 complements chronological data of central coordinates stored in chronology memory part 8 and obtains moving path of the object. When the moving path overlaps the specified area of polygon, the selecting part judges that the object is traversing the area to be monitored.

When 'moving path' is a selecting condition and the moving path is specified by a line, condition-establishing part 11 forms a plurality of areas along the line with a predetermined distance. Giving sequential numbers to the areas along the line, the condition-establishing part 11 sends information of the areas and the sequential numbering to object-selecting part 10. When an object passes through all areas on the moving path in the sequential order, object-selecting part 10 judges the object is moving along the specified moving path.

When 'moving direction' is a selecting condition and the moving direction is specified by 'up', 'down', 'left' and 'right', condition-establishing part 11 sends information of a specified moving direction to object-selecting part 10. Object-selecting part 10, using central coordinates information of chronological information stored in chronology memory part 8, calculates current moving direction of an object from a difference between current central coordinates and past central coordinates back-tracked by a predetermined period of time. Taking fluctuation of the central coordinates into consideration, the current moving direction of the object can be obtained by averaging a plurality of moving directions of the object by varying time to be back-tracked. Object-selecting part 10 finds out a moving direction of the object closest to one of 'up', 'down', 'left' and 'right', and when the direction meets the direction specified by condition-establishing part 11, the object-selecting part determines the object is moving toward the specified direction. When 'traverse area' is combined into the selecting condition, the central coordinates of the specified area where the object passes through is used when making a selection.

When 'stagnant time' is a selecting condition and when an upper limit of the stagnant time is specified by number of seconds, condition-establishing part 11 first sends the specified time in number of seconds to object-selecting part 10. Object-selecting part 10 uses time information of an object stored in chronological information in chronology memory part 8, and when time difference between present and time when identification of the object started exceeds a specified period of time, the object-selecting part judges that the object is staying for over the specified period of time. However, when a selecting condition of 'traverse area' or 'moving path' is combined with the 'stagnant time', stagnant time of the object in the area to be monitored or in the moving path is used for making the selection.

When 'color' is a selecting condition and when a color is chosen from an item list listing such as 'red', 'blue', 'yellow' and 'green', condition-establishing part 11 sends the specified color information to object-selecting part 10. Object-selecting part 10 uses color information of an object in chronological information stored in chronology memory part 8, and when a color of an object is most similar to the color chosen by condition-establishing part 11, the object-selecting part judges that the object is in the specified color. However, when a selecting condition of 'traverse area' or 'moving path' is combined with the selecting condition, color information of the object while the object is in the area to be monitored or in the moving path is used in making the selection.

When a plurality of selecting conditions are combined, object-selecting part 10 judges that an object which satisfies every conditions given by condition-establishing part 11 is an object which satisfies the combined condition therefore is the object to be traced. As an example, when selecting conditions of 'passing through area A' and 'stagnant for over B seconds' are combined, the object-selecting part selects an object having chronological information 41 of 'stagnant in the area A for over B seconds' in chronological memory part 8.

When a negative condition is combined, object-selecting part 10 judges the selecting condition of an object is met only when all the selecting conditions are satisfied except for the negative condition and none of negative condition is met. As an example, when a selecting conditions of 'passing area A' and a negative condition of 'red' are combined, the object-selecting part 10 selects an object having chronological information 41 of 'passing area A but not red in color' in chronology memory part 8.

As explained, object-selecting part 10, based on a selecting condition of chronological information 41 of an object to be traced sent by condition-establishing part 11, selects an object satisfying the selecting condition of chronological information 41 of the object to be traced, as the object to be traced. The object tracing part then outputs positional information of the object to be traced in wide-angle picture 21 to control part 12.

When a plurality of objects to be traced exists in wide-angle picture 21, object-selecting part 10 checks objects one by one based on the priority order until an object meeting the highest priority of the selecting condition is identified.

As described, the object-selecting part outputs an object to be traced meeting a higher rank of priority out of a plurality of objects in wide-angle picture 21.

Control part 12 drives drive-part 4 of N video camera 3 based on position information of the object-to-be-traced output by object-selecting part 10, moving N video camera 3 in a direction so as N video camera faces the object to be traced for taking the picture of it. Driving method of drive part 4 of this invention is not limited to the method based on positional information, but the method disclosed by the Unexamined Japanese Patent Publication No. H11-69342 can also be used.

Figure 7:
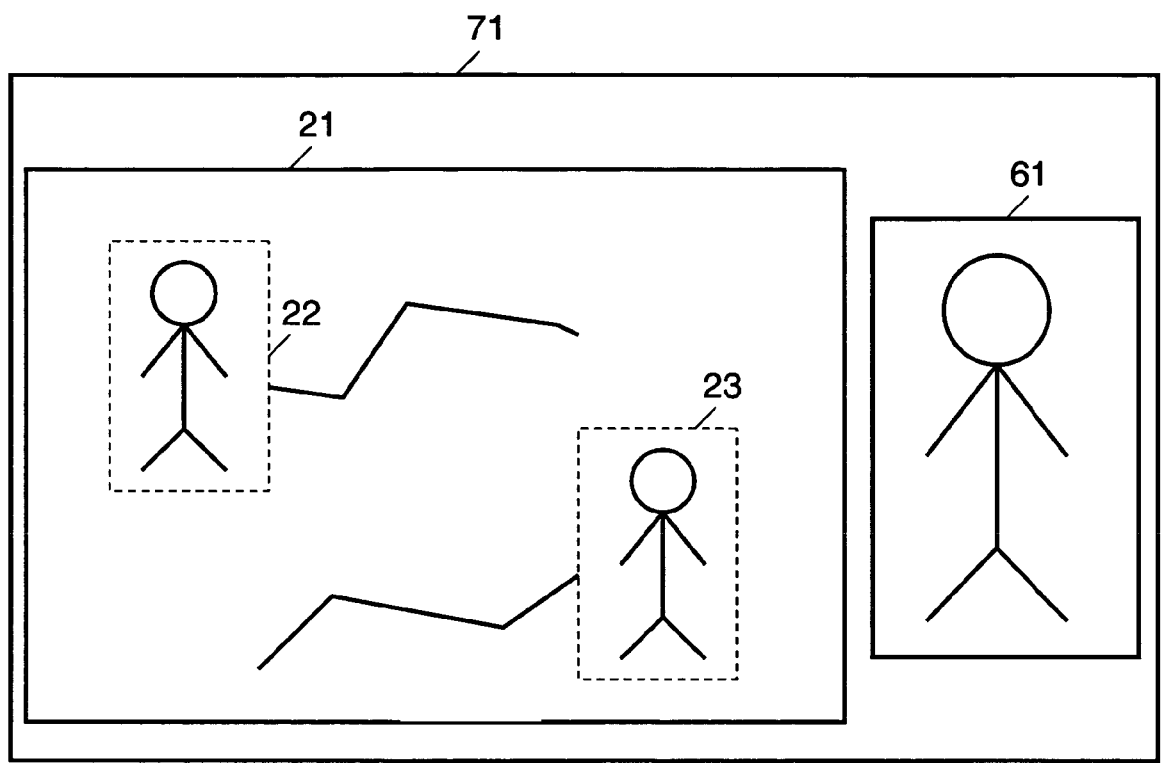
FIG. 7 is a schematic diagram showing an example of output information of the object tracing device in accordance with the exemplary embodiment of the present invention.

Output information creating part 9 receives chronological information 41 of each of a plurality of objects from chronology memory part 8, wide-angle picture 21 from W video camera 2, and video picture 61 of an object to be traced from N video camera 3, produces output information 71 as shown in FIG. 7. FIG. 7 is an example of such output information 71 of object-tracing-device 20 in accordance with the exemplary embodiment of the present invention. As shown in FIG. 7, in output information 71, chronological information 41 of each of a plurality of objects is displayed superimposed on wide-angle picture 21 and enlarged picture 61 of the object to be traced is displayed. By changing color of an object in wide-angle picture 21 on the priority ranking, the surveyor can identify the most possibly suspicious object at a glance.

Output information creating part 9 sends created output information 71 to output device 14, then output device 14 displays output information 71 as shown in FIG. 7 on its display part (not illustrated).

Any function of object-identifying part 5, framing part 6, chronological-information-creating part 7, object-selecting part 10, condition-establishing part 11, output information creating part 9 and control part 12 of object tracing device 20 in accordance with the exemplary embodiment of the present invention may be realized by software as long as the prescribed function is satisfied in each block. Such prescribed function may be realized by hardware including a specialized circuit.

Figure 8:
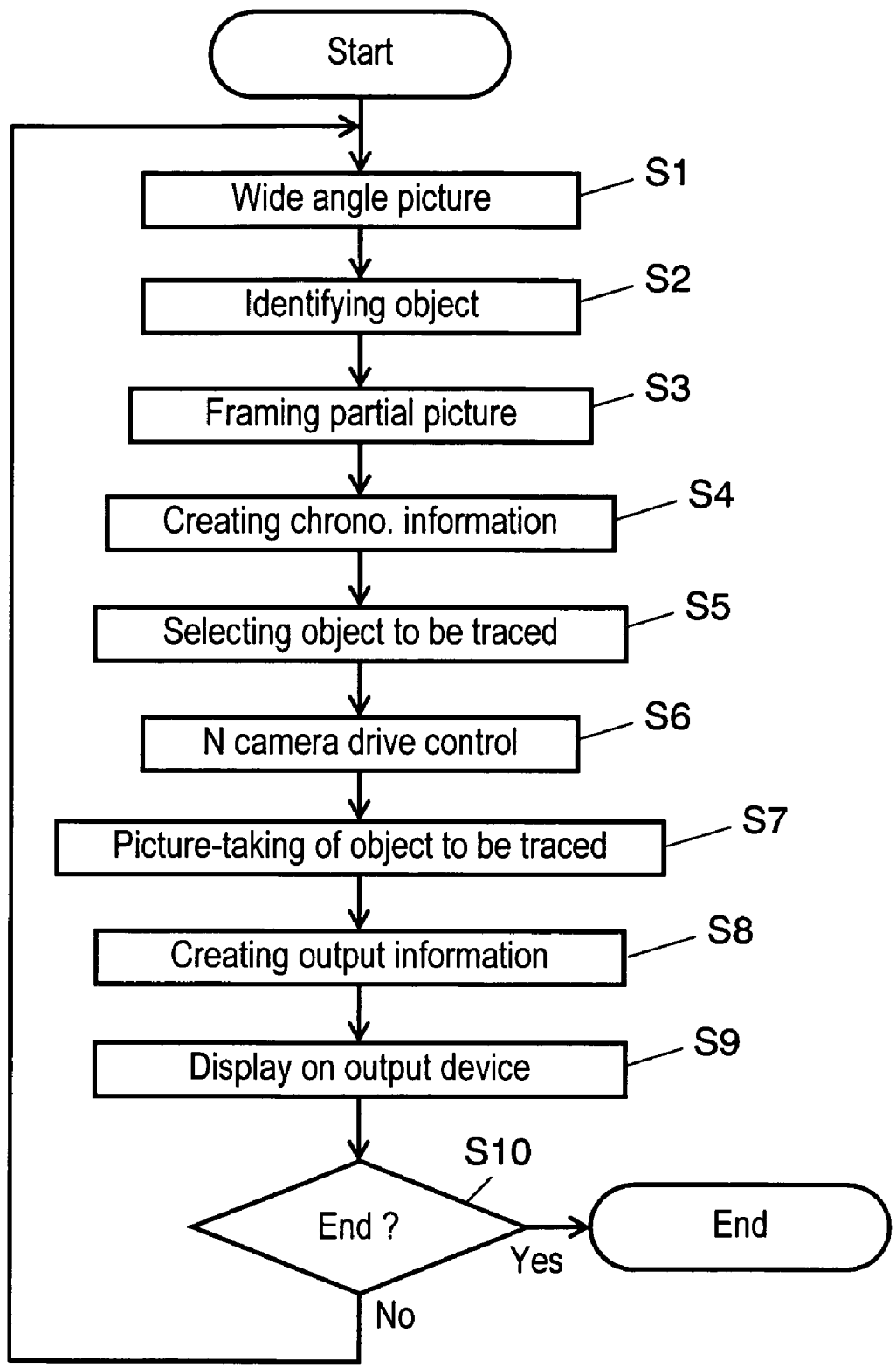
FIG. 8 is a flow chart showing steps of action in the object tracing system in accordance with the exemplary embodiment of the present invention.

Next, working process of object tracing system 30 in accordance with the exemplary embodiment of the present invention is explained. FIG. 8 is a flow chart showing working steps of the object tracing system 30. It is assumed here that a surveyor has finished inputting a selecting condition of an object-to-be-traced to condition-establishing part 11 using input device 13, and condition-establishing part 11 has sent a condition of chronological information 41 which should correspond to the input selecting condition including priority information to object-selecting part 10.

As shown in FIG. 8, W video camera 2 first takes a wide-angle picture 21 to be monitored, then W picture-input part 15 inputs the video picture to object-identifying part 5 (S1).

Object-identifying part 5 identifies a plurality of potential objects to be traced in wide-angle picture 21, and then sends coordinates information indicating position of the objects in wide-angle picture 21 to framing part 6. Object-identifying part 5 also sends wide-angle picture 21 to chronological-information-creating part 7 (S2).

Framing part 6 frames out a partial view of each of the objects identified by object-identifying part 5 from wide-angle picture 21, and send the framed out view to chronological-information-creating part 7 (S3).

Chronological-information-creating part 7 creates chronological information 41 of each of the plurality of objects based on the partial view of each of the object sent by framing part 6 and wide-angle picture 21 sent by object-identifying part 5(S4). Chronology memory part 8 stores memory of chronological information 41.

Object-selecting part 10 selects, from chronology memory part 8, an object having chronological information 41 meeting chronological information 41 of an object to be traced which is given by condition-establishing part 11 (S5).

Object-selecting part 10 sends positional information of the object to be traced in wide-angle picture 21 to control part 12. Control part 12 drives drive-part 4 of N video camera 3 directing N video camera 3 to the object to be traced. (S6).

N video camera 3 takes a picture of the object to be traced with control part 12 and then sends the picture of the object to be traced to N picture-input part 16. N picture-input part 16 inputs the image of the object to be traced to output information creating part 9 (S7).

Output information creating part 9 creates output information 71 based on wide-angle picture 21 taken by W video camera 2, chronological information 41 created by chronological-information-creating part 7, and the picture of the object to be traced taken by N video camera 3, and then sends the information to output device 14 (S8).

Output device 14 displays received information 71 on a display part (S9).

When process of step 9 is finished, object-tracing-system 30 returns to step 1 for taking a wide-angle picture, and the process of step 1 to step 9 is repeated until a surveyor inputs a notice to end the process (S10).

As described, with object tracing system 30 and object tracing device 20 in accordance with the exemplary embodiment of the present invention, an object which always meets a highest priority of selecting condition is identified as an object to be traced, out from a plurality of objects in wide-angle picture 21 taken by wide-angle W video camera 2, and N video camera 3. takes an enlarged picture of the identified object Because of the arrangement, even when a new object comes into the area to be monitored after the wide-angle video camera has identified an intruding object in the area to be monitored and the telephoto video camera has started tracing and taking a picture of the object, the system and device can still trace potentially a most suspicious object. Even when a plurality of objects is picture-taken in wide-angle picture 21, the system and the device can still trace a most suspicious object.

Object tracing system 30 and object tracing device 20 in accordance with the exemplary embodiment of the present invention can establish an area to be watched with a highest priority as a 'passing area' a selecting condition of an object to be traced, such as around buildings and an area not to be entered. Thereby, a person who is in a closest position to the area to be watched can be traced.

Furthermore, if a direction coming from to the area to be monitored is suspicious, priority of the direction can be made higher than other directions, enabling the device and the system to trace a person coming from a specific direction.

Object tracing system 30 and object tracing device 20 can monitor a store for an example, by taking a picture of a whole floor in wide-angle picture 21 and by setting selecting conditions of 'passing area' at an area to be monitored such as a gate area of the store and 'moving direction' in a direction an object is coming from to the area to be monitored. Thereby, the system and the device can automatically display an enlarged picture of all person coming into the store and record the history of respective person in a recording media, while continually monitoring the whole floor.

In above explanation of the exemplary embodiment of the present invention, a person is explained as an object to be traced, but the application of the invention is not limited only to tracing a person. The invention can be applied to any moving object which is to be traced including animals and vehicles.

As has been demonstrated, the object tracing device, the object tracing system and the object tracing method according to the present invention can trace an object coming into an area-to-be monitored, even after another invading object has been identified in a picture of the area to be monitored taken by a wide-angle video camera and a telephoto video camera has started tracing and taking a picture of the object. Thus, the object tracing device, the object tracing system and the object tracing method, having two video cameras of a different picture angle, in which a wide-angle video camera takes a picture of objects to be traced for making a selection of an object to be traced and a telephoto lens video camera takes a picture of the selected object for tracing, are useful.

The invention claimed is:

1. An object tracing device comprising:
   a first picture-input part inputting a picture of an area taken by a first picture-taking device;
   a second picture-input part inputting a further picture taken by a second picture-taking device of a portion of said area which is narrower than said area;
   an object-identifying part identifying a plurality of objects in the area;
   a chronological-information-creating part creating chronological information of each of the plurality of objects including respective positional information and a respective time associated with the respective positional information in the picture of the area;
   an input guide display for providing a plurality of multiple selection conditions, wherein said plurality of multiple selection conditions are provided in priority order, so that said second picture-taking device moves with an object meeting at least one of said multiple selection conditions with higher priority instead of moving with a further object meeting at least one of said multiple selection conditions with a lower priority;
   an object selecting part for performing the following steps in the following order:
      a) causing said second picture-taking device to move with said further object which meets at least one of said multiple selecting conditions which have been selected while i) said further object is in the area taken by said first picture-taking device, and ii) said object is not in the area taken by said first picture taking device; and
      b) causing said second picture-taking device to move with said object instead of moving with said further object when:
         i) said further object remains in the area taken by said first picture-taking device,
         ii) said object enters the area which is taken by said first picture-taking device, and
         iii) said object meets at least one of said multiple selection conditions which are higher in priority than said at least one of said multiple selection conditions which are met by said further object.

2. The object tracing device according to claim 1, further comprising a framing part framing a partial view of each of the plurality of objects identified by the object-identifying part, wherein the chronological-information-creating part creates the chronological information of each object using the partial view.

3. The object tracing device according to claim 2, wherein the chronological-information-creating part creates positional information that is central coordinates of the partial view.

4. The object tracing device according to claim 1, further comprising an output-information-creating part creating output information of the wide-angle picture input by the first-picture-input part, an enlarged picture of the object to be traced input by the second picture-input part, and the chronological information of the plurality of the objects.

5. The object tracing device according to claim 4, wherein the output-information-creating part creates output information of the chronological information of the plurality of objects to be superimposed on the wide-angle picture.

6. An object tracing system comprising:
   a first picture-taking device taking a picture of an area;
   a second picture-taking device taking a further picture of a portion of said area which is narrower than said area;
   a driving part driving the second picture-taking device; and
   an object tracing device,
   wherein, the object tracing device includes:
      an object-identifying part identifying a plurality of objects in the wide-angle picture taken by the first picture-taking device; and
      a chronological-information-creating part creating chronological information of each of the plurality of objects including respective positional information and a respective time associated with the respective positional information in the picture of the area;
   an input guide display for providing a plurality of multiple selection conditions, wherein said plurality of multiple selection conditions are provided in priority order, so that said second picture-taking device moves with an object of said plurality of objects meeting at least one of said multiple selection conditions with higher priority instead of moving with a further object of said plurality of objects meeting at least one of said multiple selection conditions with a lower priority;
   an object selecting part for performing the following steps in the following order:
      a) causing said second picture-taking device to move with said further object which meets at least one of said multiple selecting conditions which have been selected while i) said further object is in the area taken by said first picture-taking device, and ii) said object is not in the area taken by said first picture taking device; and
      b) causing said second picture-taking device to move with said object instead of moving with said further object when:
         i) said further object remains in the area taken by said first picture-taking device,
         ii) said object enters the area which is taken by said first picture-taking device, and
         iii) said object meets at least one of said multiple selection conditions which are higher in priority than said at least one of said multiple selection conditions which are met by said further object.

7. An object tracing method using an object tracing device comprising:
   a first picture-input part inputting a picture taken by a first picture-taking device taking a picture of an area; and
   a second picture-input part inputting a further picture of a portion of said area which is narrower than said area,
   wherein, the object tracing method includes the steps of:
   providing a plurality of multiple selection conditions, wherein said plurality of multiple selection conditions are provided in priority order, so that said second picture-taking device moves with an object meeting at least one of said multiple selection conditions with higher priority instead of moving with a further object meeting at least one of said multiple selection conditions with a lower priority;
   performing the following steps in the following order:
      a) causing said second picture-taking device to move with said further object which meets at least one of said multiple selecting conditions which have been selected while i) said further object is in the area taken by said first picture-taking device, and ii) said object is not in the area taken by said first picture-taking device; and b) causing said second picture-taking device to move with said object instead of moving with said further object when:
  i) said further object remains in the area taken by said first picture-taking device,
  ii) said object enters the area which is taken by said first picture-taking device, and
  iii) said object meets at least one of said multiple selection conditions which are higher in priority than said at least one of said multiple selection conditions which are met by said further object.

8. An object tracing device according to claim 1, wherein said selections are made using a plurality of respective check boxes.

9. An object tracing device according to claim 1, wherein said selection conditions including at least two of the object's passing area, stagnant time, moving direction, moving path or color information in the wide-angle picture.

10. An object tracing device according to claim 1, wherein said selection conditions including at least two of the object's passing area, stagnant time, moving direction, moving path or color information in the wide-angle picture.

11. An object tracing device according to claim 6, wherein said selection conditions include at least two of the object's passing area, stagnant time, moving direction, moving path or color information in the wide-angle picture.

12. An object tracing method according to claim 7, wherein said selection conditions include at least two of the object's passing area, stagnant time, moving direction, moving path or color information in the wide-angle picture.

* * * * *